(12) United States Patent
Kurachi

(10) Patent No.: US 6,250,708 B1
(45) Date of Patent: Jun. 26, 2001

(54) HOLDING DEVICE FOR SHAFT MEMBER

(75) Inventor: Katsuhito Kurachi, Nisshin (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/547,703

(22) Filed: Apr. 11, 2000

(30) Foreign Application Priority Data

Apr. 20, 1999 (JP) .................................................. 11-111721

(51) Int. Cl.$^7$ ........................................................ B60J 3/00
(52) U.S. Cl. ............................................................ 296/97.9
(58) Field of Search ................................. 296/97.9, 97.13, 296/97.1; 248/475.1, 291.1

(56) References Cited

U.S. PATENT DOCUMENTS 5,056,853 * 10/1991 Vanorder .............................. 296/97.9
5,451,022 * 9/1995 Peterson .......................... 296/97.9 X
5,967,589 * 10/1999 Spadafora ............................ 296/97.9
6,003,928 * 12/1999 Curtindale ............................ 296/97.7

* cited by examiner

Primary Examiner—D. Glenn Dayoan
Assistant Examiner—Lori L. Coletta
(74) Attorney, Agent, or Firm—Kanesaka & Takeuchi

(57) ABSTRACT

A holding device of a shaft, i.e. a shaft for a sun visor, includes a base and a holder. The base includes a base main portion and anchors. The holder has a holder main portion and a supporting leg. The supporting leg is provided with lock portions on an outer periphery thereof. The lock portions are engaged with a back surface of the base main portion when they are inserted into the inserting hole, and the supporting leg is rotated from an inserted position. Thus, the holding device for the sun visor can be easily attached to a vehicle body.

9 Claims, 16 Drawing Sheets

HOLDING DEVICE FOR SHAFT MEMBER

BACKGROUND OF THE INVENTION AND RELATED ART STATEMENT

The invention relates to a holding device for a shaft member, in particular, a shaft attached to a sun visor, so that the sun visor can be easily attached to or detached from a vehicle.

A conventional sun visor has been screwed to a car body through a bracket. However, in the conventional bracket, there have defects such that not only a special tool for screwing the sun visor to the car body but also much labor are required. Also, when the sun visor is disassembled, a special tool and much labor for removing screws are required.

In view of the above defects, the present invention has been made, and an object of the invention is to provide a holding device of a shaft member or a shaft for a sun visor, wherein the shaft or the shaft with the sun visor can be easily attached to or detached from the body.

Another object of the invention is to provide a holding device of a shaft member as stated above, wherein a holder can be easily detached from a base.

A further object of the invention is to provide a holding device of a shaft member as stated above, wherein the base can be easily detached from the body.

A still further object of the invention is to provide a holding device of a shaft member as stated above, wherein the holder can be easily attached to the base.

Further objects and advantages of the invention will be apparent from the following description of the invention.

SUMMARY OF THE INVENTION

In order to attain the above objects, according to a first aspect of the invention, a holding device includes a base and a holder. The base is fixed to an attaching hole of a car body, i.e. body. The holder rotatably supports a shaft of a sun visor, and is detachably fixed to the base.

The base has a base main portion and anchors. The base main portion includes an inserting hole having an outer diameter larger than that of the attaching hole. The anchors project from a back surface of the base main portion, and passes through the attaching hole of the body while the anchors are contracted or deformed. The anchors, after passing through the attaching hole, restore the shapes to engage a back surface of the body.

The holder includes a holder main portion and a supporting leg. The holder main portion includes a shaft hole for allowing a shaft to pass therethrough, and has a size larger than that of the inserting hole of the base main portion. The supporting leg projects from a back surface of the holder main portion, and passes through the inserting hole.

The supporting leg has lock portions. The lock portions engage the back surface of the base main portion when the lock portions are inserted into the inserting hole and the supporting leg is rotated from an inserted position.

According to a second aspect of the invention, the shaft includes a flange and a first groove. The flange is disposed at the middle of the shaft and extends from an outer periphery of the shaft. The flange has an outer diameter larger than that of the shaft hole of the holder main portion. The first groove extends to a center of the shaft from the outer periphery of the flange.

The holder main portion is provided with second grooves for releasing lock. The second grooves extend radially outwardly from an inner circumferential surface of the shaft hole. One of the second groove communicates with the first groove at a position where the supporting leg is locked in the inserting hole of the base main portion.

According to a third aspect of the invention, the base main portion is provided with lock releasing holes. The lock releasing holes pass through the front and back surfaces of the base main portion to face the anchors.

According to a fourth aspect of the invention, key grooves are provided to an outer periphery of the shaft extended from the flange. On the other hand, keys are provided to the holder main portion. The keys can be fitted into the key grooves, but normally they are separated from the key grooves to be opposed to each other. The base main portion includes pressing portions. The pressing portions push the keys into the key grooves at the pressing positions, and are disengaged from the keys at the lock positions.

DETAILED DESCRIPTION OF PREFERRED EMBODIMENTS

FIGS. 1 to 13 show a first embodiment of a holding device of a shaft member for a sun visor according to the present invention.

Figure 1:
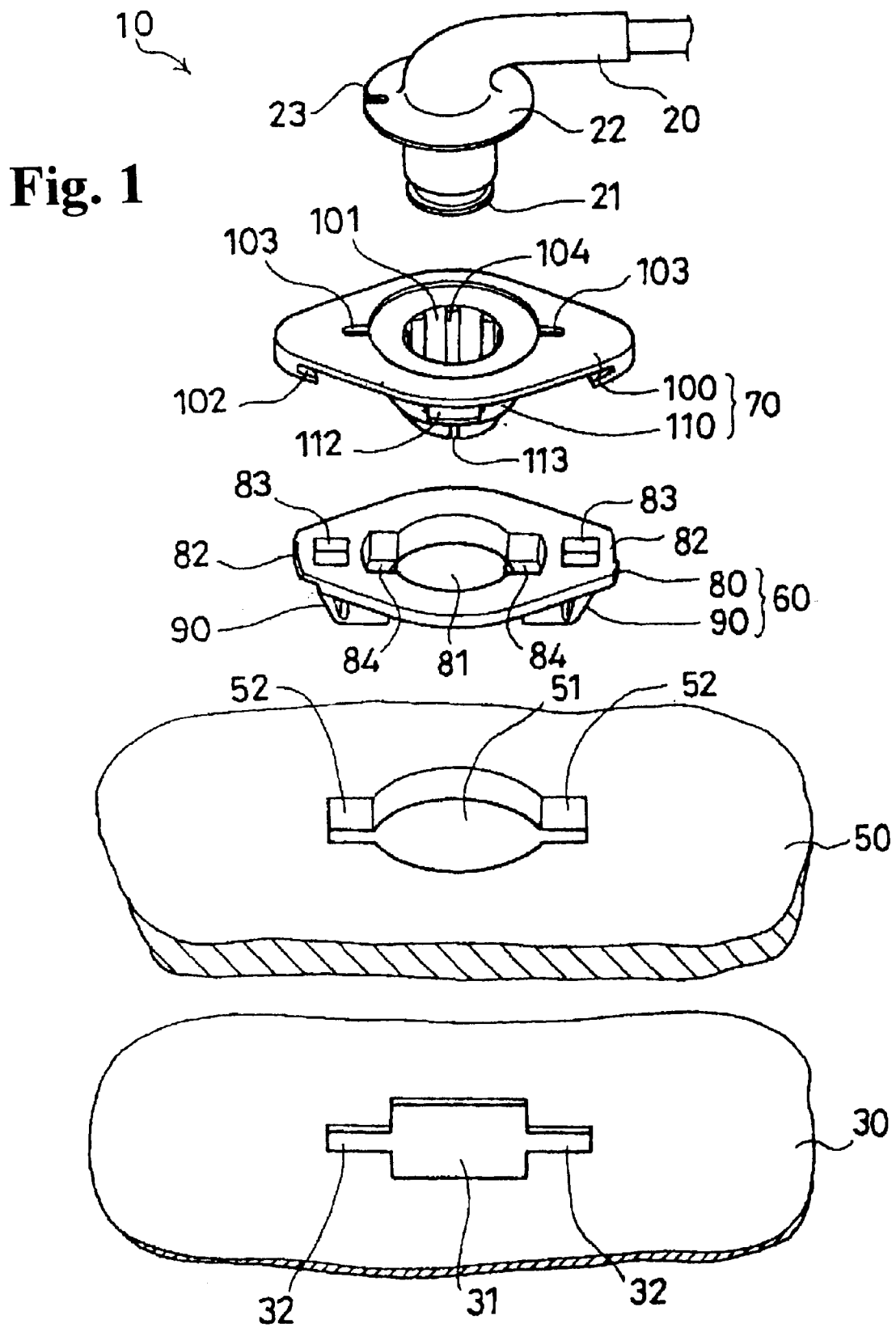
FIG. 1 is an exploded perspective view of a first embodiment of a holding device according to the present invention.

FIG. 1 is an exploded perspective view of the holding device.

Figure 2:
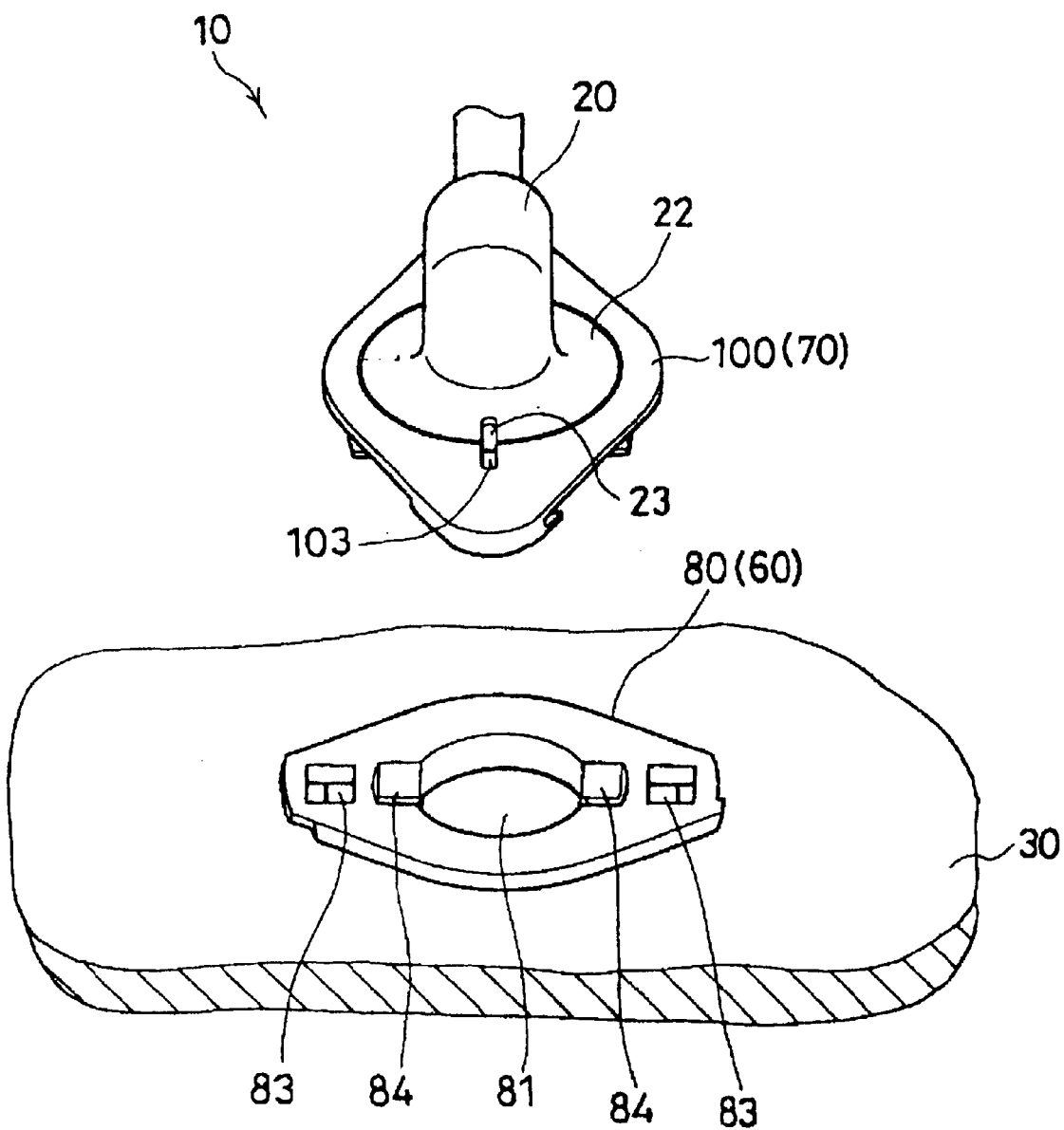
FIG. 2 is an exploded perspective view explaining an assembling process of the holding device.
Figure 3:
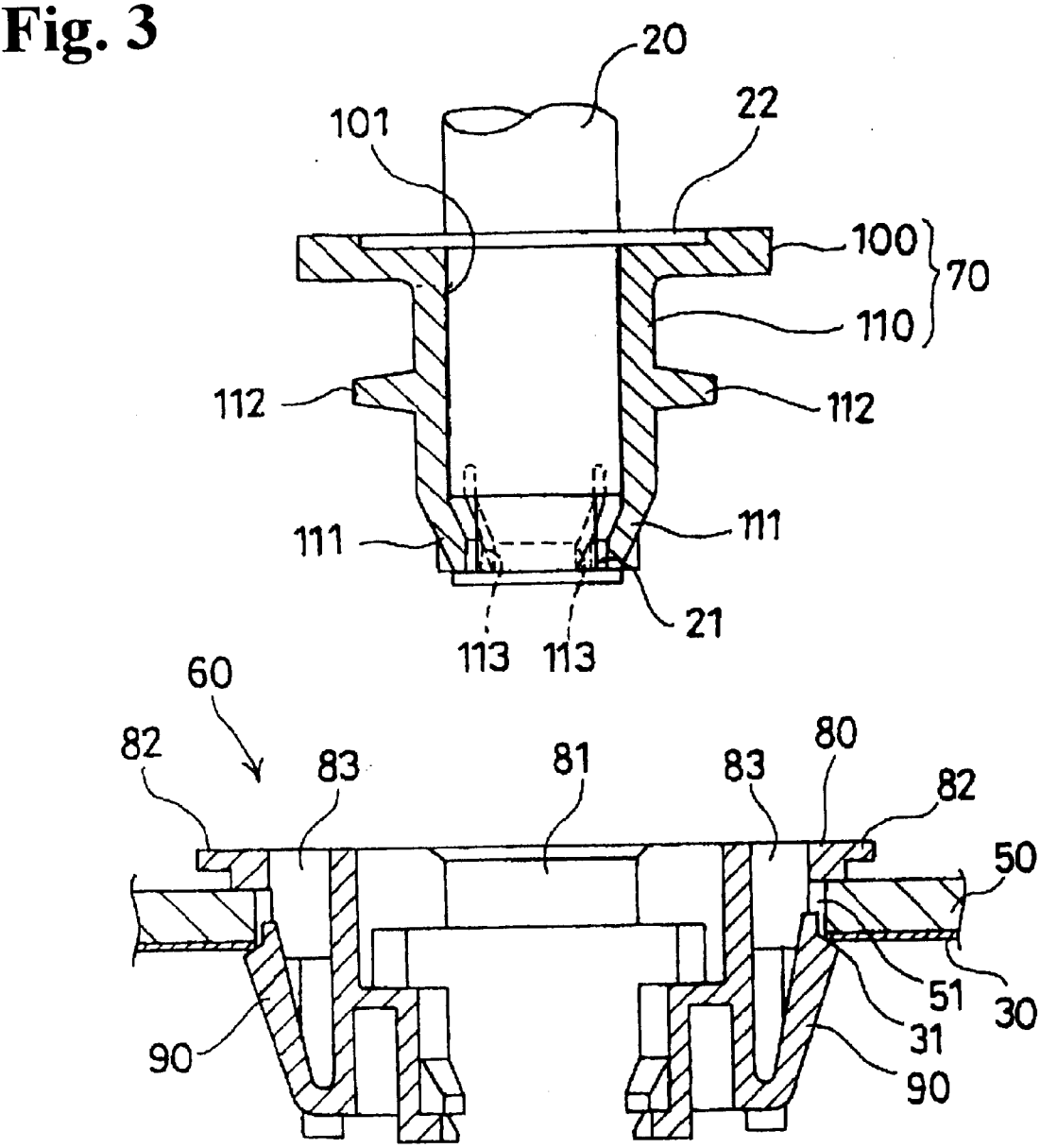
FIG. 3 is a sectional view corresponding to FIG. 2.
Figure 4:
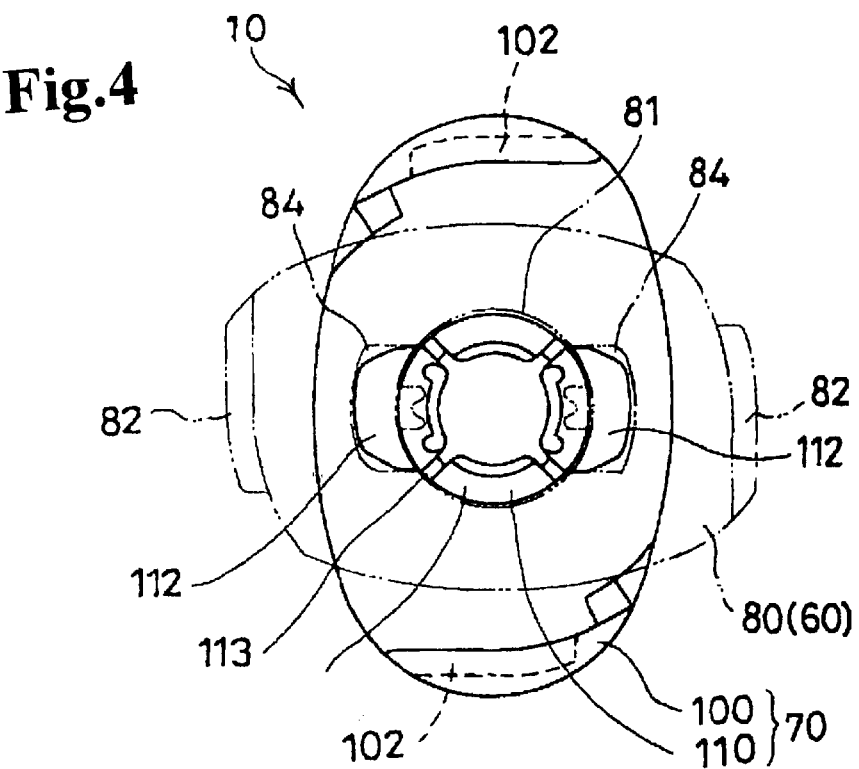
FIG. 4 is a back side view corresponding to FIG. 2.

FIGS. 2 to 4 are drawings for showing an attaching process of the holding device, wherein FIG. 2 is an exploded perspective view; FIG. 3 is a sectional view corresponding to FIG. 2; and FIG. 4 is a back side view corresponding to FIG. 2.

Figure 5:
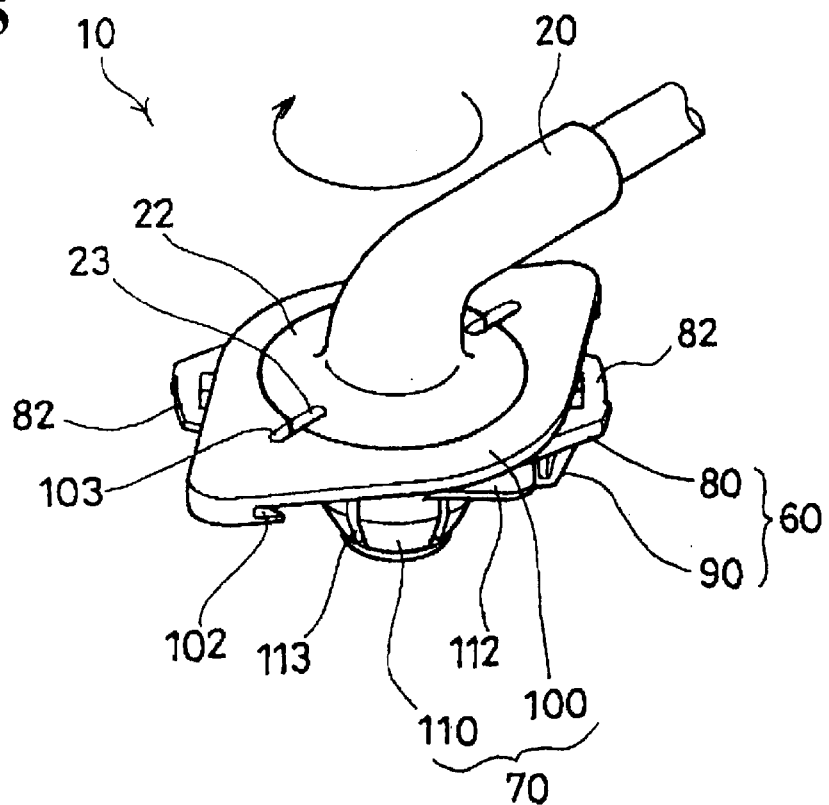
FIG. 5 is a perspective view explaining a second stage of the assembling process of the holding device.
Figure 6:
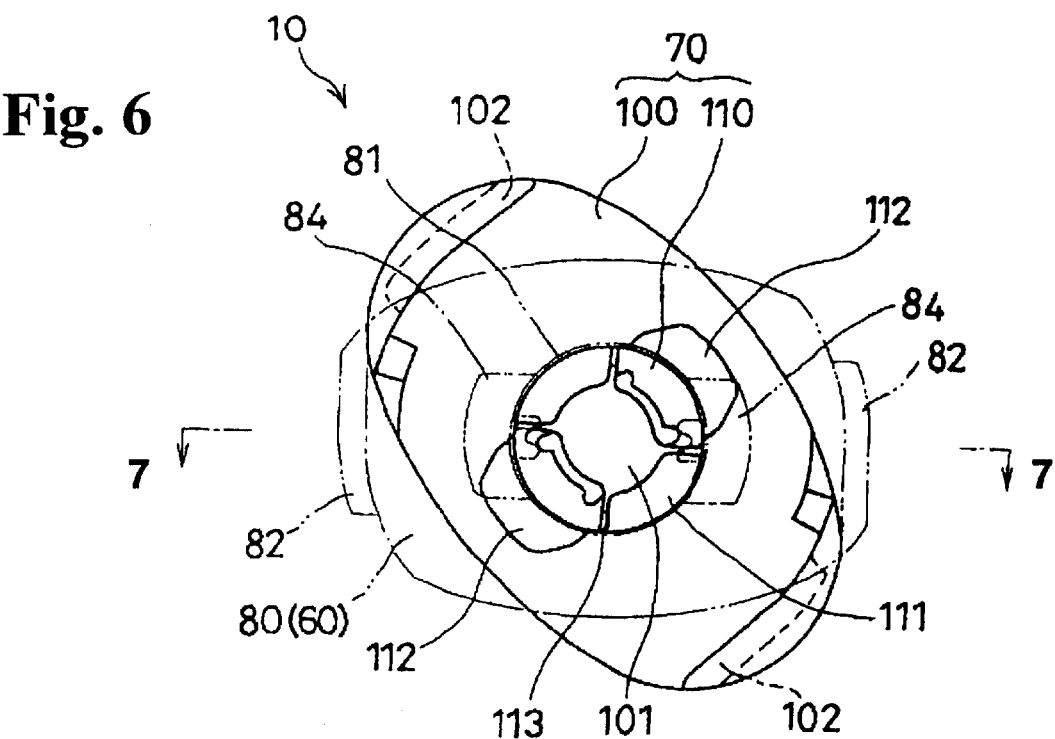
FIG. 6 is a back side view corresponding to FIG. 5.
Figure 7:
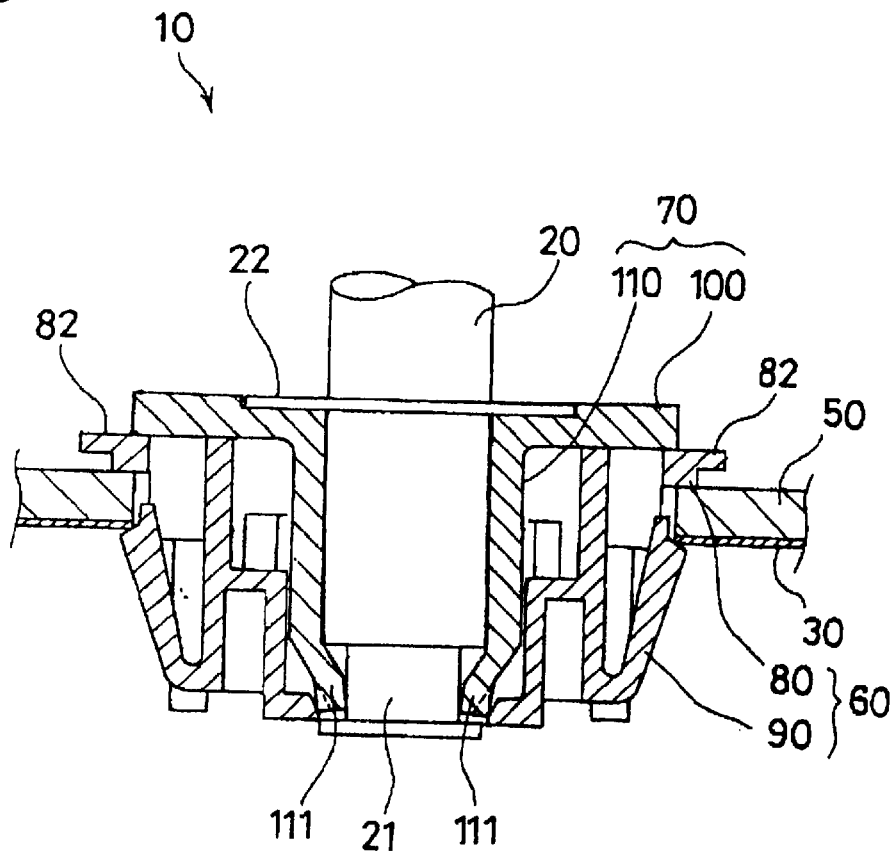
FIG. 7 is a sectional view taken along line 7—7 in FIG. 6.

FIGS. 5 to 7 are drawings for explaining a second stage of the assembling process of the holding device, wherein FIG. 5 is a perspective view; FIG. 6 is a back side view corresponding to FIG. 5; and FIG. 7 is a sectional view taken along line 7—7 in FIG. 6.

Figure 8:
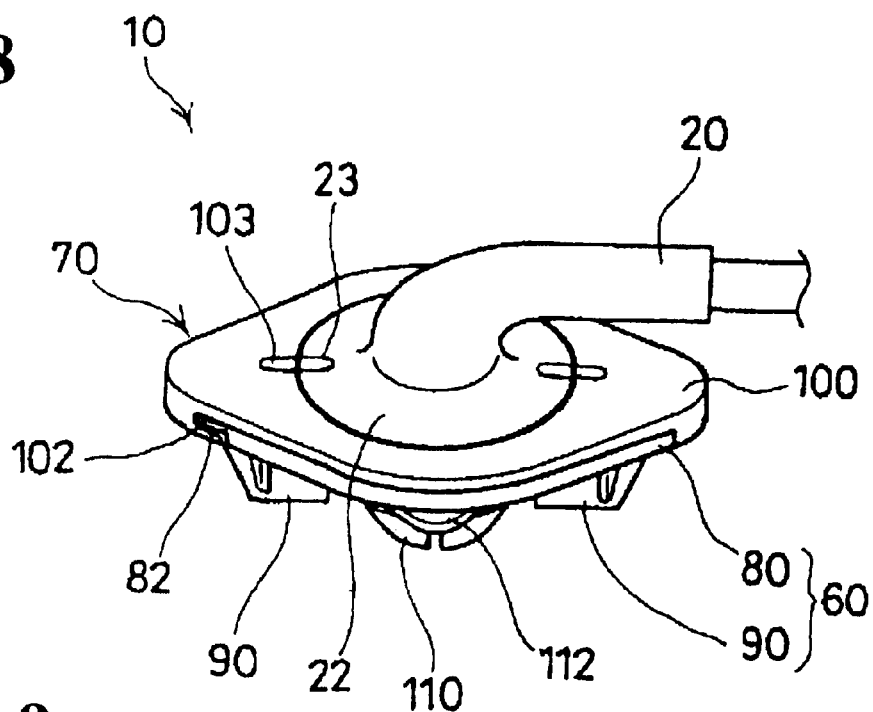
FIG. 8 is a perspective view explaining an assembled state of the holding device.
Figure 9:
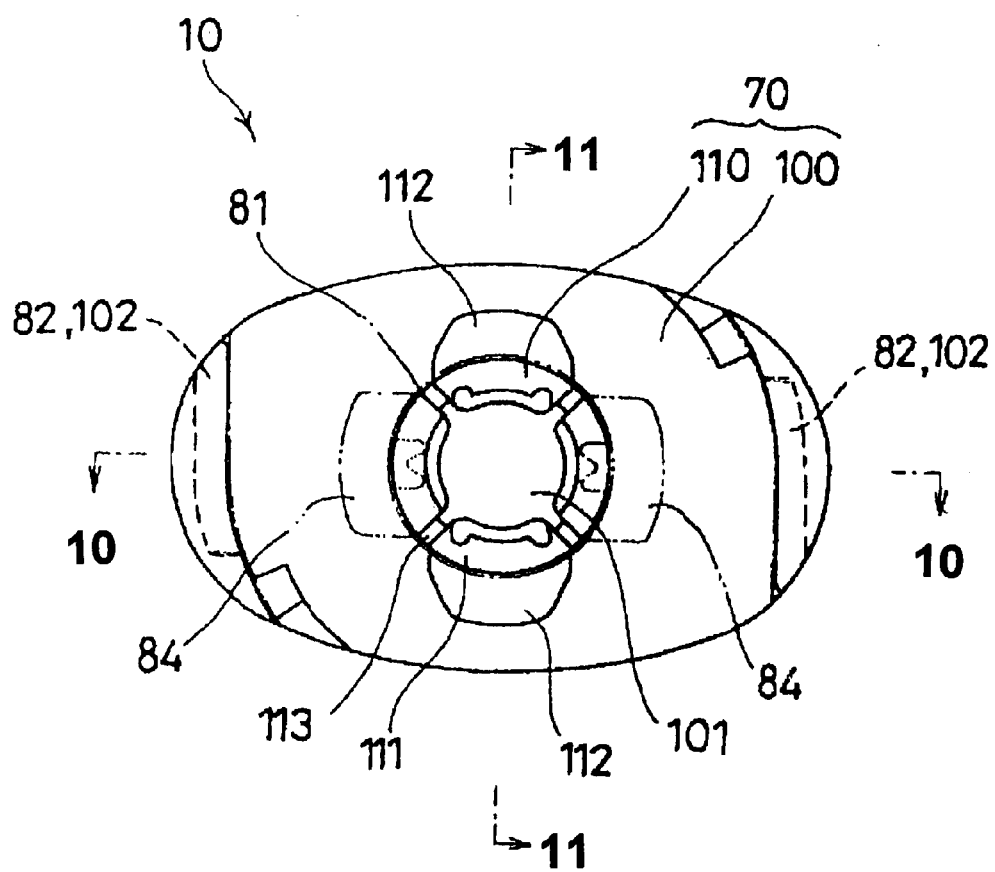
FIG. 9 is a back side view corresponding to FIG. 8.
Figure 10:
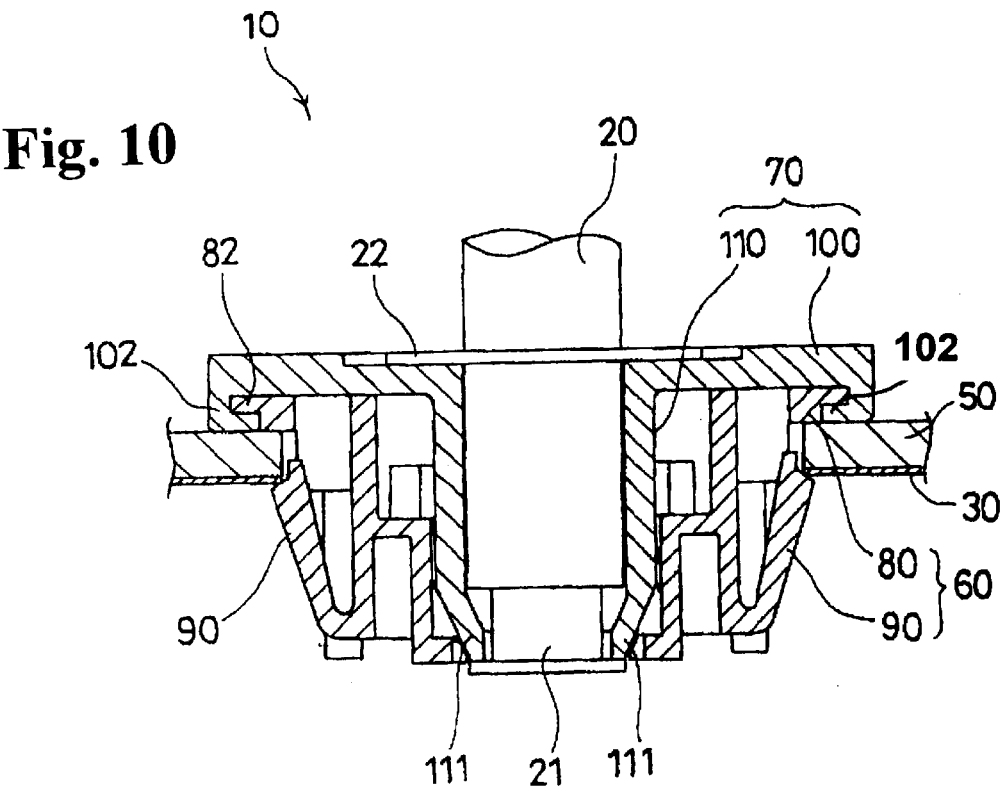
FIG. 10 is a sectional view taken along line 10—10 in FIG. 9.
Figure 11:
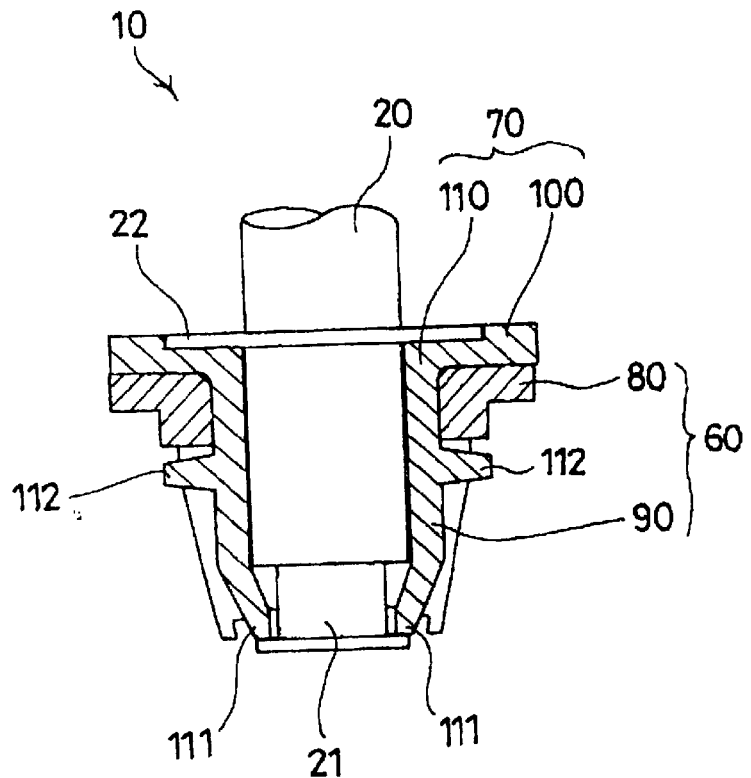
FIG. 11 is a sectional view taken along line 11—11 in FIG. 9.

FIGS. 8 to 11 are drawings explaining an assembled state of the holding device; FIG. 8 is a perspective view; FIG. 9 is a back side view corresponding to FIG. 8; FIG. 10 is a sectional view taken along line 10—10 in FIG. 9; and FIG. 11 is a sectional view taken along line 11—11 in FIG. 9.

Figure 12:
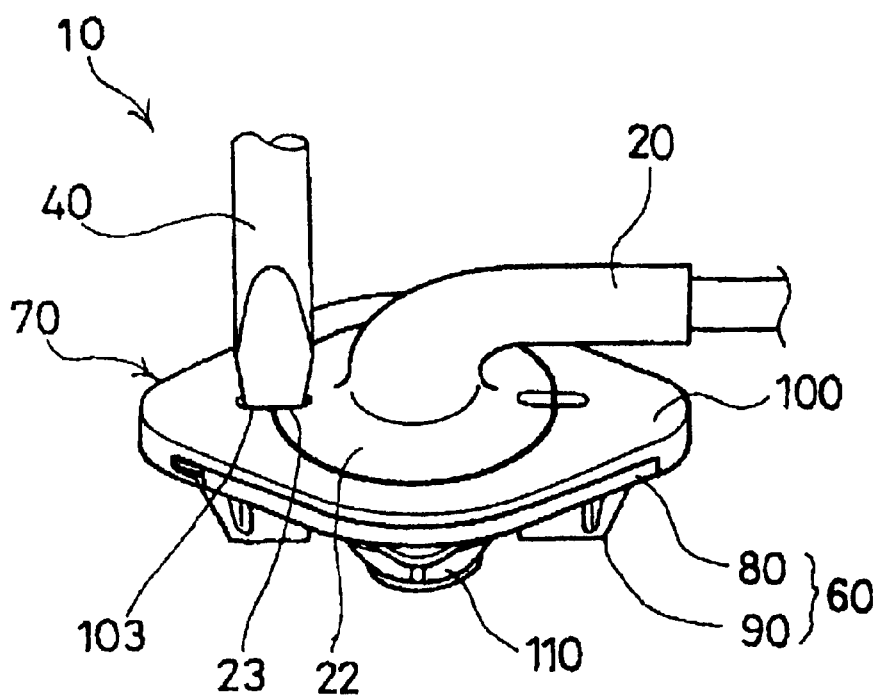
FIG. 12 is a perspective view explaining an assembling process of the holding device.
Figure 13:
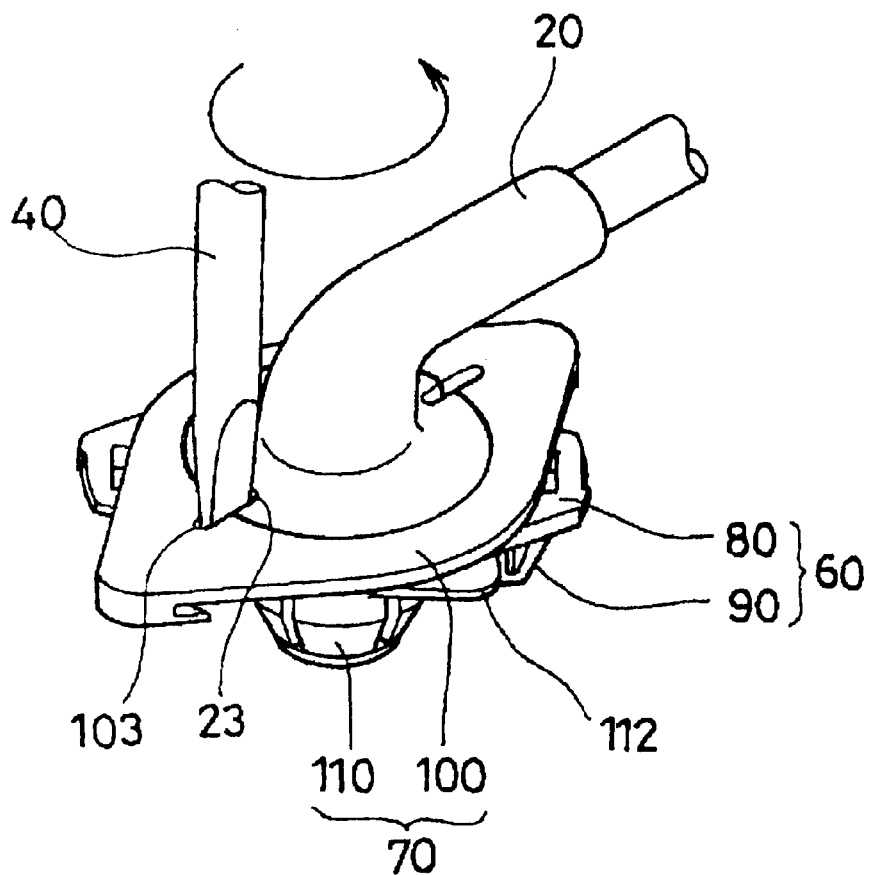
FIG. 13 is a perspective view showing a state where the holder is rotated by 45°, corresponding to FIG. 12.

FIGS. 12 and 13 are drawings explaining the assembling process of the holding device, wherein FIG. 12 is a perspective view, and FIG. 13 is a perspective view showing a state where the holder is rotated by 45°, corresponding to FIG. 12.

FIGS. 14 to 25 show a second embodiment of a holding device according to the present invention.

Figure 14:
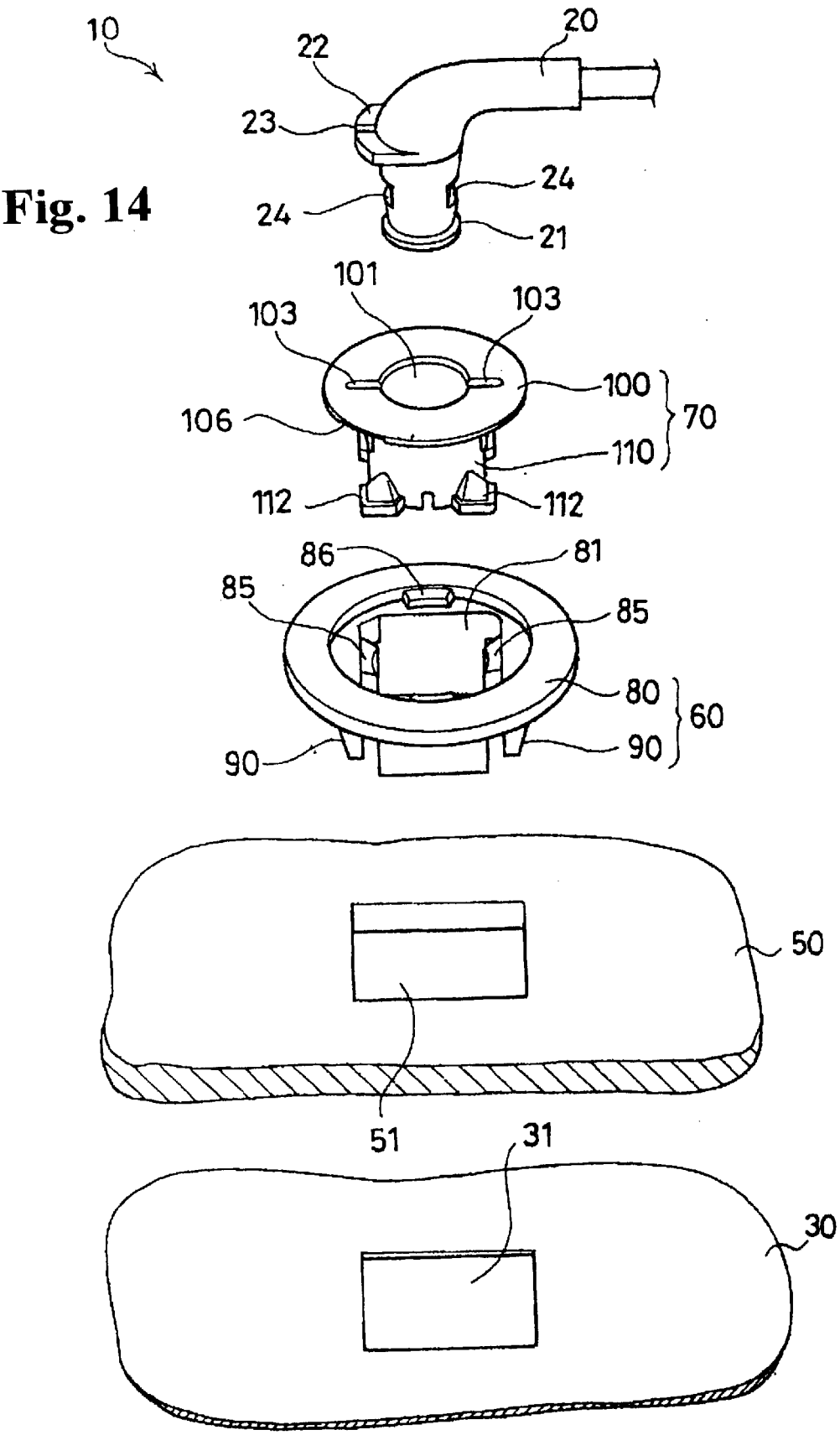
FIG. 14 is an exploded perspective view of a second embodiment of a holding device according to the present invention.

FIG. 14 is an exploded perspective view of the holding device.

Figure 15:
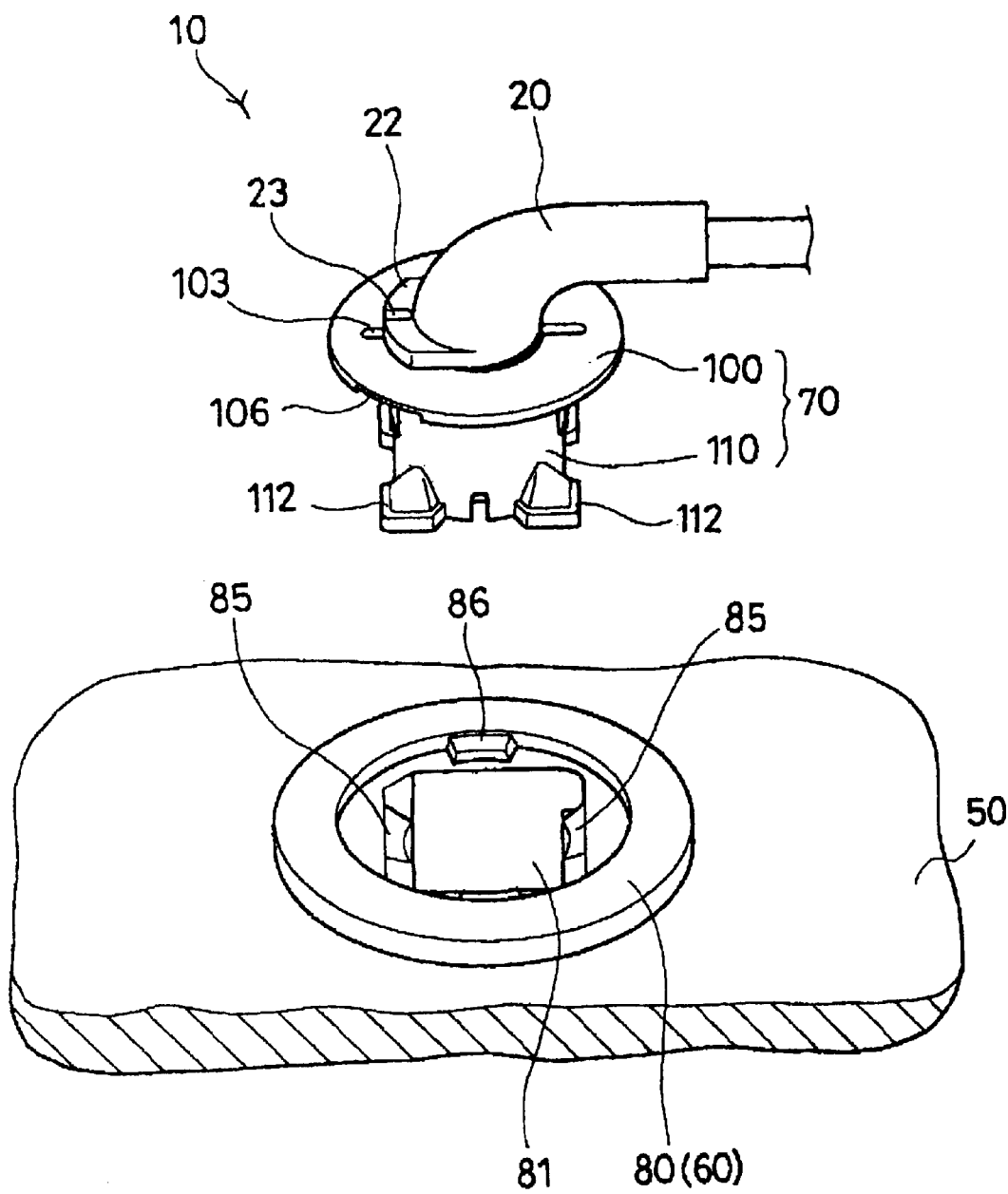
FIG. 15 is an exploded perspective view explaining an assembling process of the holding device.
Figure 16:
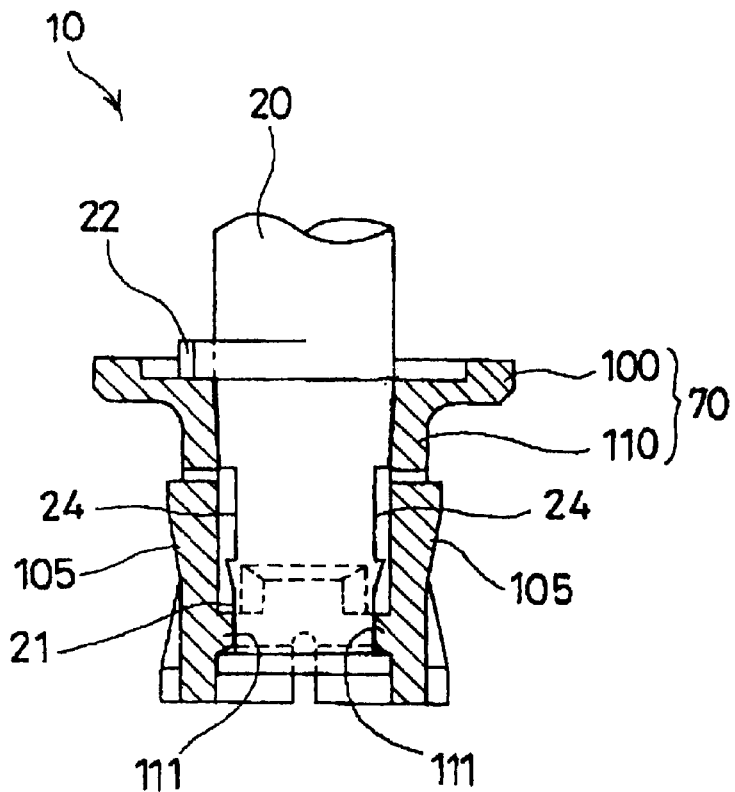
FIG. 16 is a sectional view corresponding to FIG. 15.
Figure 16:
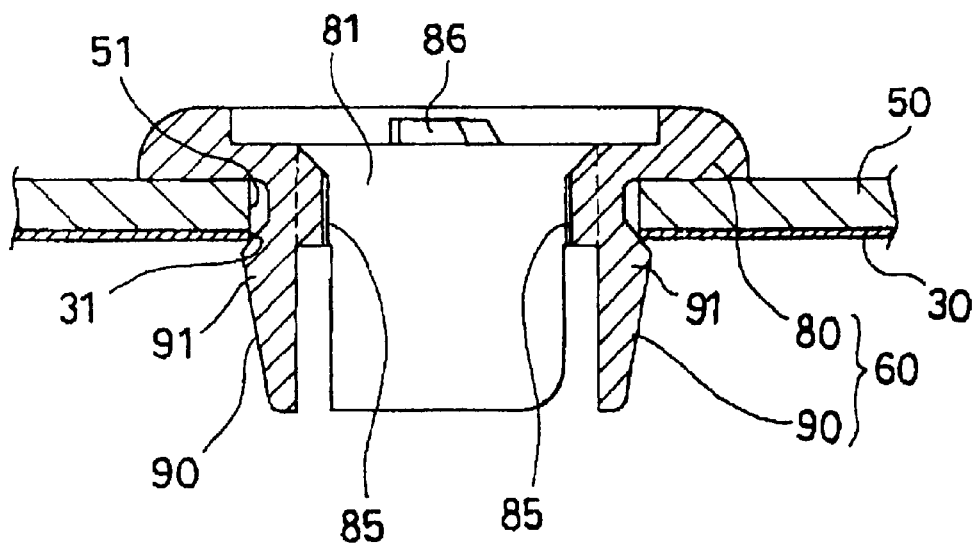

FIGS. 15 and 16 are drawings explaining an assembling process of the holding device, wherein FIG. 15 is an exploded perspective view; and FIG. 16 is a sectional view corresponding to FIG. 15.

Figure 17:
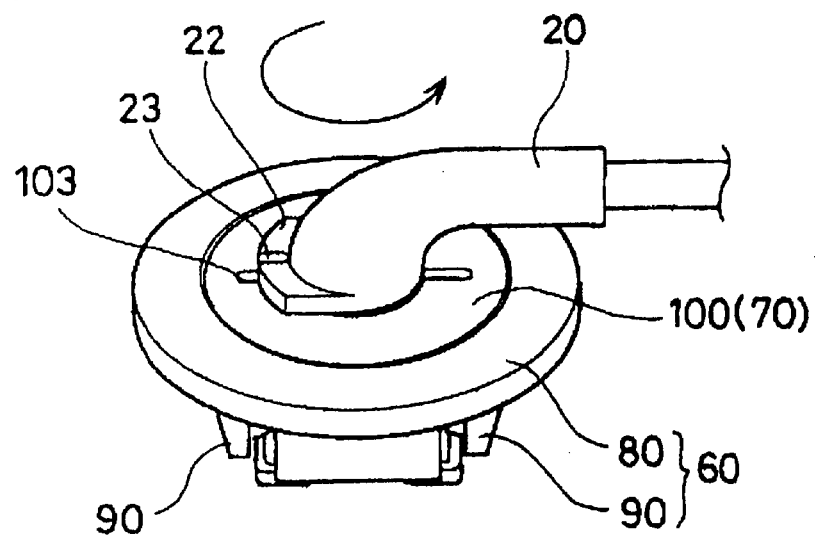
FIG. 17 is a perspective view explaining a second stage of the assembling process of the holding device.
Figure 18:
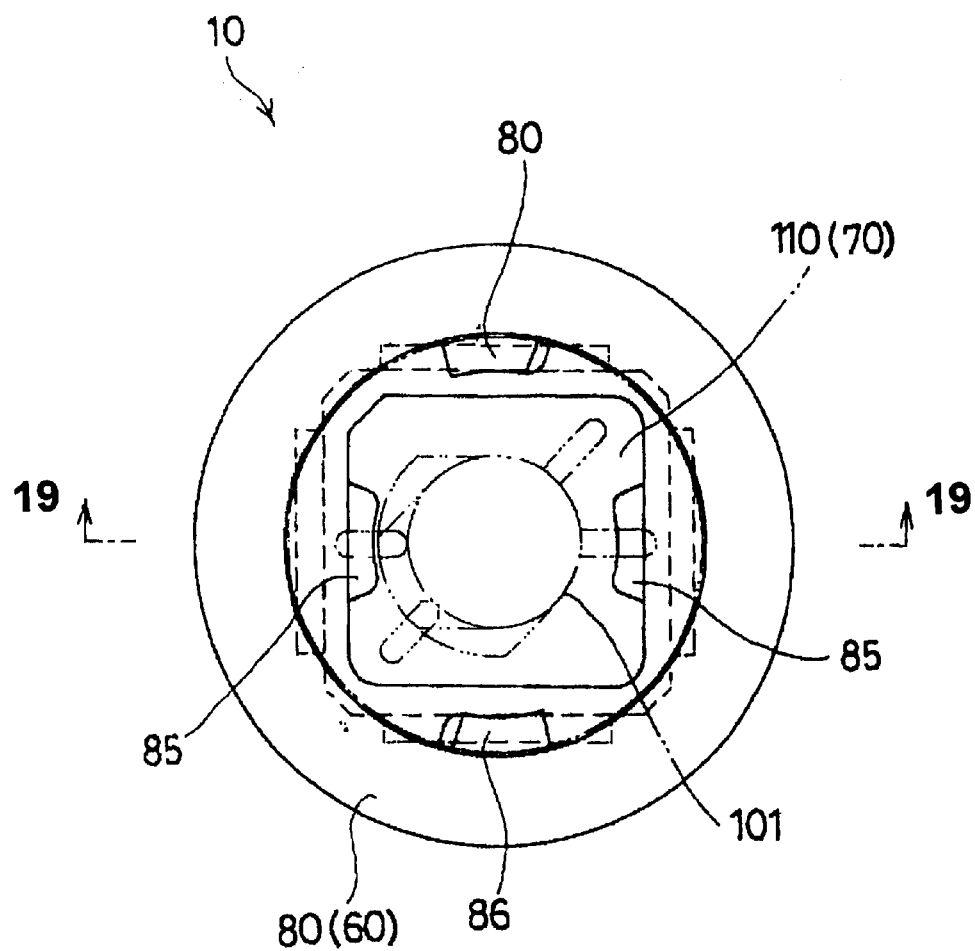
FIG. 18 is a back side view corresponding to FIG. 17.
Figure 19:
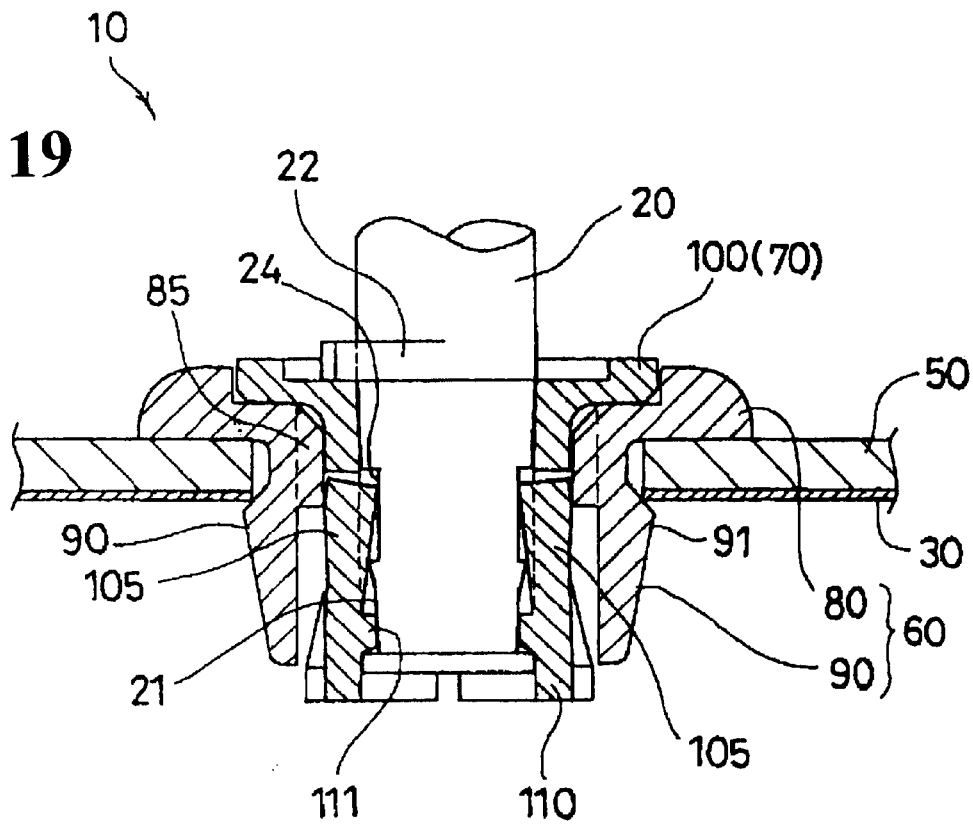
FIG. 19 is a sectional view taken along line 19—19 in FIG. 18.
Figure 20:
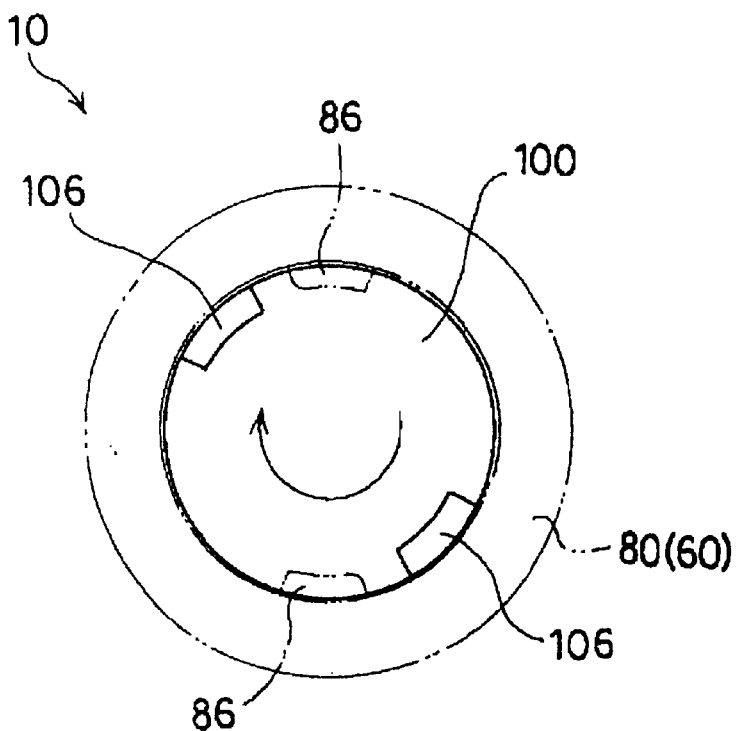
FIG. 20 is a plan view showing a relationship between the base and the holder, corresponding to FIG. 17.

FIGS. 17 to 20 are drawings explaining a second stage of the assembling process of the holding device, wherein FIG. 17 is a perspective view; FIG. 18 is a back side view corresponding to FIG. 17; FIG. 19 is a sectional view taken along line 19—19 in FIG. 18; FIG. 20 is a plan view showing a relationship between the base and the holder, corresponding to FIG. 17.

Figure 21:
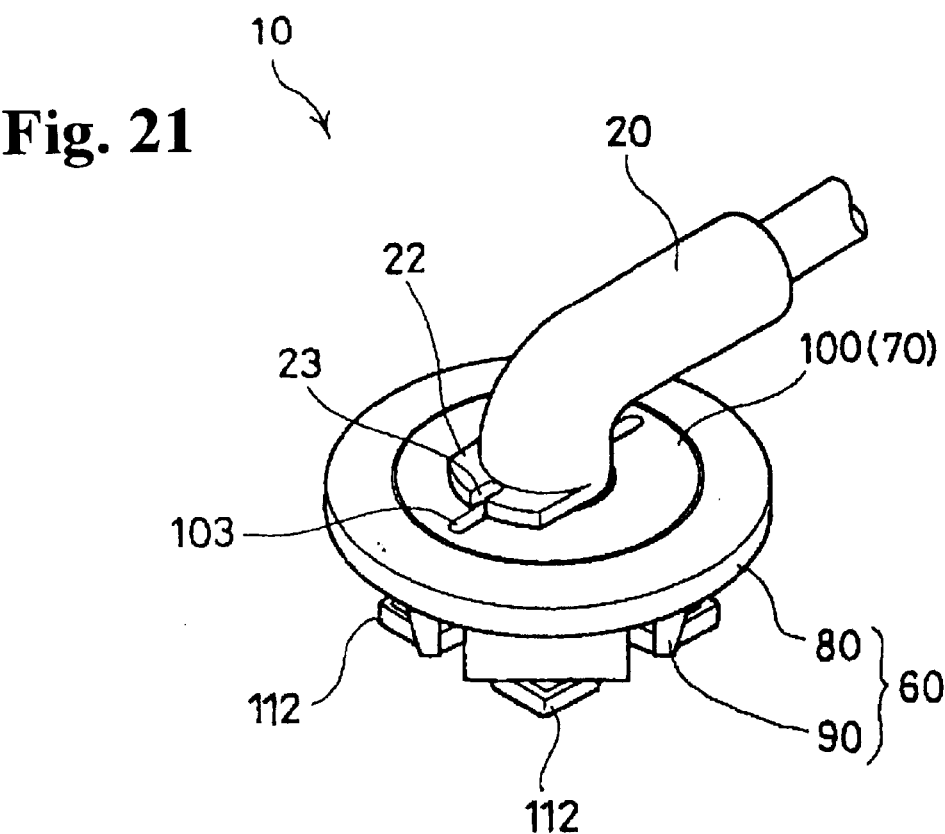
FIG. 21 is a perspective view explaining an assembled state of the holding device.
Figure 22:
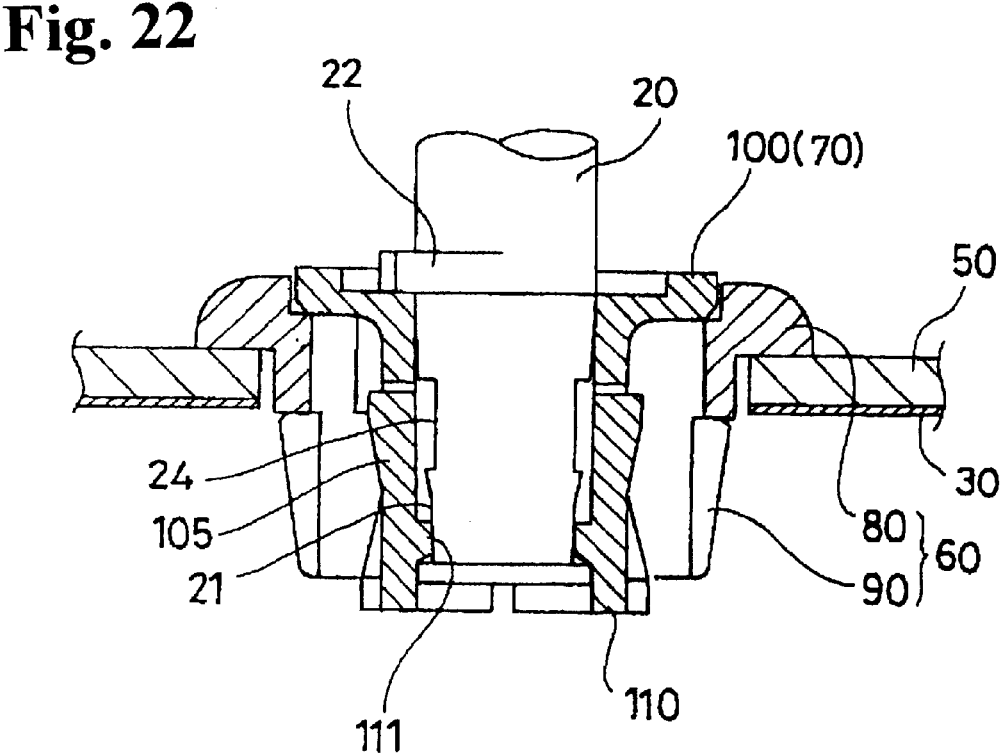
FIG. 22 is a sectional view of FIG. 21.
Figure 23:
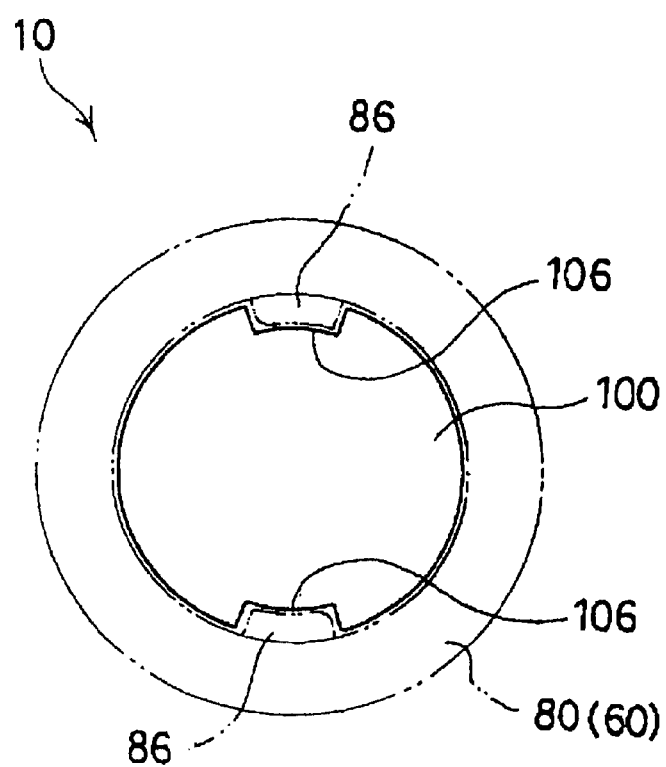
FIG. 23 is a plan view showing a relationship between the base and the holder, corresponding to FIG. 21.

FIGS. 21 to 23 are drawings explaining an assembled state of the holding device; FIG. 21 is a perspective view; FIG. 22 is a sectional view of FIG. 21; and FIG. 23 is a plan view showing a relationship between the base and the holder, corresponding to FIG. 21.

Figure 24:
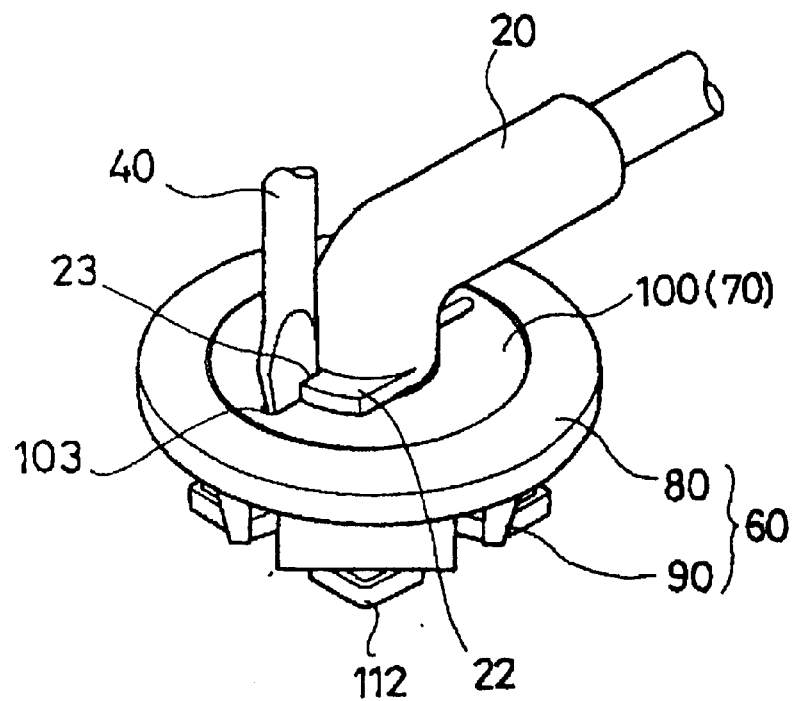
FIG. 24 is a perspective view explaining an assembling process of the holding device.
Figure 25:
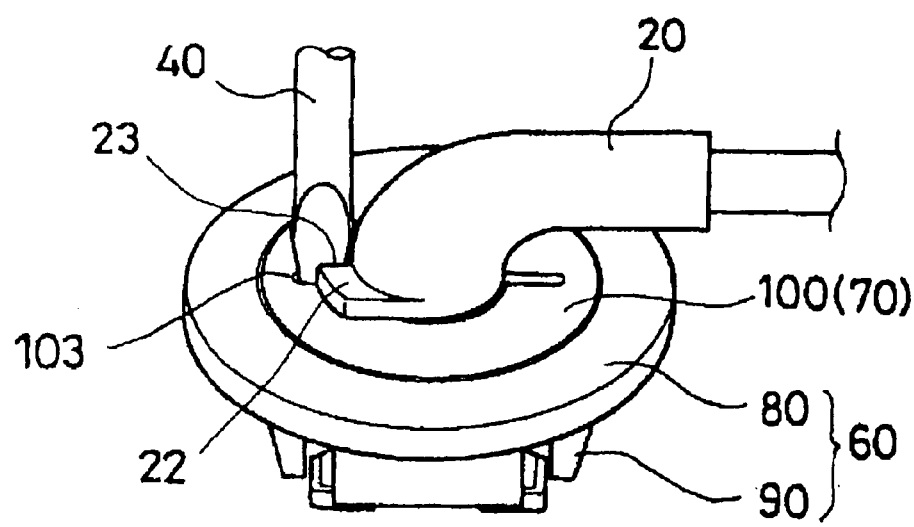
FIG. 25 is a perspective view showing a state where the holder is rotated by 45°, corresponding to FIG. 24.

FIGS. 24 and 25 are drawings explaining an assembling process of the holding device, wherein FIG. 24 is a perspective view; and FIG. 25 is a perspective view showing a state where the holder has been rotated by 45°, corresponding to FIG. 24.

In the drawings, reference numeral 10 represents a holding device of a shaft for a sun visor. The holding device 10, as shown in FIG. 1, is designed to fix a shaft 20 of the sun visor (not shown) to an attaching hole 31 of a body 30 of a vehicle.

The shaft 20, as shown in FIG. 1, includes an annular groove 21 and a flange 22. The annular groove 21, as shown in FIGS. 1 and 7, is provided at a forward end of an outer circumference of the shaft 20.

The flange 22, as shown in FIG. 1, extends from a middle portion of the shaft 20. The flange 22 is provided with a first groove 23 extending from an outer circumference thereof toward a center of the shaft 20. A groove width of the first groove 23, as shown in FIG. 12, is set in the order of a size that an edge of a minus driver 40, for example, can be inserted thereinto. Incidentally, the number of the first groove 23 may be plural instead of the single groove.

As shown in FIG. 1, a roof panel 50 is fixed in a laminated state on a surface of the body 30, and is provided with a through-hole 51 to be aligned with an attaching hole 31. As shown in FIG. 1, the attaching hole 31 is provided with a pair of left and right attaching grooves 32 in a square shape extended from left and right edges thereof. The through-hole 51 has a generally circular shape, as shown in FIG. 1, and is also provided with a pair of left and right notches 52 radially extending in a strip shape to correspond to a pair of the left and right attaching grooves 32.

The holding device 10, as shown in FIG. 1, includes generally a base 60 and a holder 70. The base 60, as shown in FIG. 1, has generally a base main portion 80 and a pair of anchors 90. The base 60 is integrally formed of a thermoplastic resin, such as POM, having a suitable elasticity and rigidity.

The holder 70 includes generally a holder main portion 100 and a supporting leg 110. The holder 70 is integrally formed of a thermoplastic resin, such as POM, having a suitable elasticity and rigidity. The base main portion 80, as shown in FIG. 1, has substantially a diamond shape and its outer shape is larger than the attaching hole 31. The base main portion 80, as shown in FIG. 1, includes an inserting hole 81, inserting members 82 and lock releasing holes 83. The inserting hole 81, as shown in FIG. 1, is disposed at a center of the base main portion 80 to generally have a circular shape, and passes through front and back surfaces of the base main portion 80. The inserting hole 81 is formed with a size such that the supporting leg 110 of the holder 70 can be inserted thereinto.

Also, the inserting hole 81, as shown in FIG. 1, is provided with a pair of left and right depressed portions 84 extending in a longitudinal direction of the base main portion 80. The inserting members 82, as shown in FIG. 3, project in an L-shape from left and right edges of the base main portion 80 in its longitudinal direction, respectively.

The lock releasing holes 83, as shown in FIG. 1, are positioned, each between the inserting hole 81 and the left or right inserting member 82, and pass through the front and back surfaces of the base main portion 80. The lock releasing hole 83 has substantially a square shape to face left or right anchor 90 disposed on a back side of the base main portion 80. The lock releasing hole 83 has such a size that an edge of a driver 40 can be inserted thereinto.

The anchors 90, as shown in FIG. 3, project from a back surface of the base main portion 80 and pass through the attaching grooves 32 of the body 30 while contracting the sizes thereof. After the anchors 90 have passed through the attaching hole 31, they are restored to engage the back surface of the body 30.

More specifically, the anchors 90, as shown in FIG. 3, are disposed on both edge portions of the base main portion 80 in its longitudinal direction, and have a section of a V-shape, respectively.

A holder main portion 100, as shown in FIG. 1, has substantially the same diamond shape as that of the base main portion 80, and has an outer shape larger than that of the inserting hole 81. The holder main portion 100, as shown in Fig. 1 includes a shaft hole 101 and inserting grooves 102.

The shaft hole 101, as shown in FIG. 1, has substantially a circular shape, and is positioned at a center of the holder main portion 100. The shaft hole 101 extends from a front surface of the base main portion 80 toward the supporting leg 110, and passes therethrough. An inner diameter of the shaft hole 101 is set to a size larger than an outer diameter of the shaft 20.

Also, the shaft hole 101, as shown in FIG. 1, is provided with a pair of left and right second grooves 103, one of which communicates with the first groove 23. A groove width of the second groove 103, as shown in FIG. 12, is equal to that of the first groove 23, i.e. a size in the order of allowing the edge of the minus driver 40 to be inserted.

Incidentally, the number of the second grooves 103 is not limited to the two grooves, and may be one groove or more than three grooves.

Also, an inner peripheral surface of the shaft hole 101, as shown in FIG. 1, is provided with a plurality of ribs 104 radially extending toward a center of the shaft hole 101. A friction resistance between an outer peripheral surface of the shaft 20 and the inner peripheral surface of the shaft hole 101 can be reduced by the ribs 104.

The inserting grooves 102, as shown in FIG. 10, are positioned at left and right edges, on a back surface, of the holder main portion 100 in its longitudinal direction. The inserting grooves 102 have a groove width in the vertical direction such that the left and right inserting members 82 of the base main portion 80 can be fitted into the inserting grooves 102 from the side.

The supporting leg 110, as shown in FIG. 1, has a cylindrical shape and projects from a back surface of the holder main portion. The supporting leg 110 has an outer diameter substantially equal to an inner diameter of the inserting hole 81 of the base 60.

The supporting leg 110, as shown in FIGS. 1 and 3, includes claw portions 111 and lock portions 112. The claw portions 111, as shown in FIG. 3, are elastically fitted into the annular groove 21 of the shaft 20 inserted into the shaft hole 101 to thereby prevent the shaft 20 from being extracted from the shaft hole 101.

Specifically, as shown in FIG. 3, a plurality of slits 113 is radially extended from a lower edge of the supporting leg 110, and a plurality of the claw portions 111 is formed between adjacent slits 113, respectively.

The lock portions 112, as shown in FIGS. 3 and 4, extend from an outer periphery of the supporting leg 110, and are aligned with the depressed portions 84 of the inserting hole 81 of the base 60 to be inserted thereinto. Then, as shown in FIGS. 8 and 9, the supporting leg 110 is rotated by 90° from the inserted position to engage the back surface of the base main portion 80.

Specifically, the lock portions 112, as shown in FIGS. 3 and 4, extend from the outer periphery of the supporting leg 110 in the opposite directions in a tongue shape to be perpendicular to the base main portion 80. The lock portions 112, as shown in FIGS. 3 and 4, have a size smaller than an inner shape of the depressed portions 84 of the inserting hole 81.

Next, an assembling method of the holding device 10 having the above-described structure is explained.

First, the base 60, as shown in FIG. 2, is assembled to the body 30. More specifically, the left and right anchors 90 of the base 60 are inserted into the left and right attaching grooves 32 of the body 30 by using the elasticity thereof through the left and right notches 52 of the roof panel 50, as shown in FIG. 1. The left and right anchors 90 of the base 60, as shown in FIG. 3, elastically engage the back surface of the body 30 so that the base 60 is not extracted from the attaching hole 31 of the body 30.

On the other hand, the shaft 20, as shown in FIG. 2, is attached to the holder 70. In other words, the shaft 20, as shown in FIG. 1, is aligned with the shaft hole 101 of the holder 70 and then inserted thereinto. At this time, the claw portions 111 of the holder 70, as shown in FIG. 3, are fitted into the annular groove 21 of the shaft 20 by their elasticity, so that the shaft 20 is prevented from being extracted from the shaft hole 101 of the holder 70 and, at the same time, is rotatably supported around the shaft hole 101 of the holder 70.

Next, the holder 70, as shown in FIGS. 5 and 8, is attached to the base 60. More specifically, the left and right lock portions 112 of the holder 70, as shown in FIG. 4, are aligned with the left and right depressed portions 84 of the base 60 and inserted thereinto. Thereafter, the holder main portion 100 of the holder 70, as shown in FIG. 5, is rotated by 90°.

When the holder 70 is rotated, the left and right lock portions 112, as shown in FIGS. 9 and 11, engage the back surface of the base main portion 80 to thereby prevent the supporting leg 110 of the holder 70 from being extracted from the inserting hole 81 of the base 60.

Also, at this time, the left and right inserting members 82 of the base main portion 80, as shown in FIG. 10, are fitted into the left and right inserting grooves 102 of the holder main portion 100, respectively, to thereby regulate the rotation of the holder 70.

Next, a disassembling method of the holding device 10 is explained.

First, the holder 70, as shown in FIGS. 12 and 13, is disassembled from the base 60. Specifically, an edge of the driver 40, as shown in FIG. 12, is inserted into the first groove 23 and the second groove 103 communicating with each other to rotate the shaft 20 and the holder 70 by 90°, as shown in FIG. 13.

When the holder 70 is rotated, as shown in FIG. 4, the left and right lock portions 112 and the left and right depressed portions 84 of the base 60 coincide with each other to thereby allow the supporting leg 110 to be extracted from the inserting hole 81 of the base 60.

Also, the base 60 can be disassembled from the body 30. More specifically, the edge of the driver 40, not shown, is inserted into the left and right lock releasing holes 83 of the base 60, respectively, and allows the left and right anchors 90 of the base 60 to be disengaged from the back surface of the body 30 to gouge them by using the elasticity.

Incidentally, it is also possible to remove the shaft 20 from the holder 70. More specifically, the claw portions 111 of the holder 70 can be disengaged from the annular groove 21 of the shaft 20 to gouge them by the edge of the driver 40, not shown, using the elasticity, as shown in FIG. 3.

Next, a second embodiment of a holding device according to the present invention is explained with reference to FIGS. 14–25.

Characteristics of a structure of the second embodiment reside in the following four points.

First, as shown in FIG. 14, an inserting hole 81 of a base main portion 80 is formed in a square shape, and four corners of a supporting leg 110 are used as lock portions 112.

Second, as shown in FIG. 14, a shaft 20 is provided with key grooves 24. On the other hand, as shown in FIG. 16, the supporting leg 110 is provided with keys 105. When the supporting leg 110 is inserted into the inserting hole 81 of the base main portion 80, as shown in FIG. 19, the keys 105 are pressed into the key grooves 24 by pressing portions 85. As a result, in case the shaft 20 is rotated, a holder 70 can be integrally rotated. After the rotation, as shown in FIG. 22, the keys 105 are disengaged from the key grooves 24, and the shaft 20 can be rotated with respect to the holder 70.

Third, the base main portion 80, as shown in FIG. 14, is provided with projections 86. On the other hand, a back surface of a holder main portion 100, as shown in FIG. 14, is provided with step portions 106 for receiving the projections 86 therein. The projections 86 are fitted into the step portions 106 at a lock position where the holder 70 is rotated to thereby regulate the rotation of the holder 70.

Fourth, anchors 90 of a base 60, as shown in FIG. 16, are formed in a bar shape, and bulged portions 91 to be engaged with a back surface of a body 30 are formed on the outer surfaces of the anchors 90, respectively.

Incidentally, in the explanation of the structure of the second embodiment, the same structural portions as those of the first embodiment are denoted by the same reference numerals or symbols, and explanations therefor are omitted.

Next, an assembling method of a holding device 10 having the above-described structure is explained.

First, the base 60, as shown in FIG. 15, is attached to the body 30. In particular, the left and right anchors 90 of the base 60, as shown in FIG. 14, are aligned with the square attaching hole 31 of the body 30 through a square through-hole 51 of a roof panel 50 and inserted thereinto by using an elasticity thereof. The respective bulged portions 91 of the left and right anchors 90 of the base 60, as shown in FIG. 16, are elastically engaged with the back surface of the body 30, so that the base 60 is not extracted from the attaching hole 31 of the body 30.

On the other hand, as shown in FIG. 15, the shaft 20 is assembled to the holder 70. In other words, as shown in FIG. 14, the shaft 20 is aligned with the shaft hole 101 of the holder 70 and inserted.

At this time, as shown in FIG. 16, the claw portions 111 of the holder 70 are fitted into the annular groove 21 of the shaft 20 due to their elasticity to thereby prevent the shaft 20 from being extracted from the shaft hole 101 of the holder 70. At this time, since the left and right keys 105 of the supporting leg 110, as shown in FIG. 16, are separated from the left and right key grooves 24, the shaft 20 is held rotatably in the shaft hole 101 of the holder 70 as a rotating center.

Next, as shown in FIGS. 17 and 21, the holder 70 is attached to the base 60. In other words, as shown in FIG. 15, the supporting leg 110 in a square hollow shape of the holder 70 is aligned with the square inserting hole 81 of the base 60 and inserted thereinto.

At this time, as shown in FIG. 19, the left and right keys 105 are pressed into the left and right key grooves 24 by the left and right pressing portions 85 of the base main portion 80 to thereby be fitted into the respective key grooves 24. Therefore, the shaft 20 can not be rotated with respect to the holder 70.

Thereafter, the shaft 20 is rotated by 45° as shown in FIG. 17. When the shaft 20 is rotated, the holder 70 is also rotated integrally, and the lock portions 112 at the four corners are engaged with the back surface of the base main portion 80 to thereby prevent the supporting leg 110 of the holder 70 from being extracted from the inserting hole 81 of the base 60, as shown in FIG. 21.

Also, at this time, as shown in FIG. 23, the left and right projecting portions 86 of the base main portion 80 are fitted into the left and right step portions 106 of the holder main portion 100 to thereby regulate the rotation of the holder 70.

Next, a disassembling method is explained hereunder.

First, the holder 70 is disassembled from the base 60, as shown in FIGS. 24 and 25. More specifically, as shown in FIG. 24, the edge of the driver 40 is inserted into the first and second grooves 23 and 103 communicating with each other, and then the shaft 20 and the holder 70 are rotated by 45° as shown in FIG. 25. When the holder 70 is rotated, as shown in FIG. 18, the outer surfaces of the supporting leg 110 in the hollow square shape coincide with the inner surfaces of the square inserting hole 81 to thereby extract the supporting leg 110 of the holder 70 from the inserting hole 81 of the base 60.

Incidentally, the shaft 20 can also be disassembled from the holder 70. In particular, the claw portions 111 of the holder 70, as shown in FIG. 16, can also be disengaged from the annular groove 21 of the shaft 20 by gouging them with the edge of the driver 40, not shown, by using the elasticity.

Since the holding device of the invention is structured as described above, the following effects can be obtained.

According to the first aspect of the invention, the shaft with the sun visor can be easily attached to or detached from the body of the vehicle. According to the second aspect of the invention, the holder can be easily detached from the base. According to the third aspect of the invention, the base can be easily detached from the vehicle body. According to the fourth aspect of the invention, the holder can be easily assembled to the base.

While the invention has been explained with reference to the specific embodiments of the invention, the explanation is illustrative and the invention is limited only by the appended claims.

What is claimed is:

1. A holding device for rotatably holding a shaft to an attaching hole, comprising:
    a base to be fixed to the attaching hole, said base including a base main portion having an outer shape larger than the attaching hole, an inserting hole formed therein, a depression situated adjacent to and communicating with the inserting hole, and a lock releasing through-hole; and at least one anchor projecting from a back surface of the base main portion to face the lock releasing through-hole, said anchor having elasticity so that the anchor passes through the attaching hole while bending a shape thereof and restores the shape after passing through the attaching hole to thereby engage the base to the attaching hole, and
    a holder detachably fixed to the base for rotatably holding the shaft, said holder including a holder main portion having an outer shape larger than the inserting hole and a shaft hole therein for allowing the shaft to pass therethrough; and a supporting leg projecting from a back surface of the holder main portion to pass through the inserting hole, said supporting leg having a lock portion projecting laterally outwardly from an outer periphery of the supporting leg so that when the holder is engaged with the base, the supporting leg and the lock portion are inserted into the inserting hole and depression, respectively and then the holder is rotated to allow the lock portion in the depression to be located under the back surface of the main portion.

2. A holding device according to claim 1, wherein said lock portion includes at least two lock projections engaging the base.

3. A holding device according to claim 1, wherein said holder main portion includes engaging grooves at outer ends thereof, said base main portion being disposed in the engaging grooves in a lock position.

4. A combination comprising a shaft and a holding device for rotatably holding the shaft to an attaching hole, said shaft comprising a shaft portion, and a flange extending radially outwardly from an outer periphery of the shaft portion and having a first groove extending radially inwardly from an outer periphery of the flange; and said holding device comprising a base to be fixed to the attaching hole, said base including a base main portion having an outer shape larger than the attaching hole and an inserting hole therein, and at least one anchor projecting from a back surface of the base main portion, said anchor having elasticity so that the anchor passes through the attaching hole while bending a shape thereof and restores the shape after passing through the attaching hole to thereby engage the base to the attaching hole, and a holder detachably fixed to the base for rotatably holding the shaft, said holder including a holder main portion having an outer shape larger than the inserting hole, a shaft hole for allowing the shaft to pass therethrough and having a diameter less than an outer size of the flange of the shaft, and a second groove radially outwardly extending from an inner periphery of the shaft hole, said first and second grooves being aligned so that the flange and the holder main portion are rotated together to release a lock state of the shaft; and a supporting leg projecting from a back surface of the holder main portion to pass through the inserting hole, said supporting leg having a lock portion at an outer periphery thereof to engage the base when the supporting leg is inserted into the inserting hole and rotated from an inserted position.

5. A combination according to claim 4, wherein said first and second grooves communicate with each other at a position where the supporting leg is locked in the inserting hole, to release the lock state.

6. A combination according to claim 4, wherein said shaft includes an annular groove at an end thereof, and said supporting leg includes claw portions engaging the annular groove when the shaft is inserted into the supporting leg.

7. A combination according to claim 4, wherein said shaft includes key grooves on an outer periphery thereof, said supporting leg having a plurality of keys to be fitted into the key grooves, said base main portion having a plurality of pressing portions so that when the shaft and the holder in which the key grooves and keys align together are inserted into the inserting hole of the base, the pressing portions press the keys into the key grooves to allow the holder to rotate together with the shaft to thereby move to a lock position, said keys disengaging from the key grooves at the lock position.

8. A holding device for rotatably holding a shaft to an attaching hole, comprising:

a base to be fixed to the attaching hole, said base including a base main portion having an outer shape larger than the attaching hole, an inserting hole formed therein, and a plurality of pressing portions around the inserting hole; and at least one anchor projecting from a back surface of the base main portion, said anchor having elasticity so that the anchor passes through the attaching hole while bending a shape thereof and restores the shape after passing through the attaching hole to thereby engage the base to the attaching hole, and a holder detachably fixed to the base for rotatably holding the shaft, said holder including a holder main portion having an outer shape larger than the inserting hole and a shaft hole formed therein for allowing the shaft to pass therethrough; and a supporting leg projecting from a back surface of the holder main portion to pass through the inserting hole, said supporting leg having a lock portion at an outer periphery thereof to engage the base when the supporting leg is inserted into the inserting hole and rotated from an inserted position, and a plurality of keys so that when the holder is inserted into the inserting hole of the base, the pressing portions press the keys to allow the holder to rotate to thereby move to a lock position.

9. A holding device according to claim 8, wherein said inserting hole has a rectangular shape, and the shaft hole has a circular shape.

\* \* \* \* \*